United States Patent [19]

Dubinsky

[11] Patent Number: 5,333,824
[45] Date of Patent: Aug. 2, 1994

[54] EXTENSION POLE HAVING STABILIZER MEANS FOR SECURELY ATTACHING THE EXTENSION POLE TO THE MAIN POLE

[76] Inventor: Emanuel Dubinsky, 3 Cross Ridge Rd., Chappaqua, N.Y. 10514

[21] Appl. No.: 57,081

[22] Filed: May 4, 1993

[51] Int. Cl.$^5$ ............... F16N 13/00; A45B 25/00
[52] U.S. Cl. ................... 248/159; 403/299;
411/177; 135/27; 135/99; 135/114
[58] Field of Search ............ 411/177, 173; 403/299;
135/27, 114, 15.1, 25.4, 98, 99; 248/159

[56] References Cited

U.S. PATENT DOCUMENTS

| | | | |
|---|---|---|---|
| 608,925 | 8/1898 | Studams | 135/25.4 |
| 1,669,611 | 5/1928 | Goldberg | 135/99 |
| 1,706,239 | 3/1929 | Leon | 248/159 |
| 3,358,727 | 12/1967 | Hughes | 411/177 |
| 3,425,428 | 2/1969 | Schwartz | 135/114 |
| 3,811,455 | 5/1974 | Thur | 135/25.4 |
| 3,833,012 | 9/1974 | McAllister | 135/114 |
| 4,184,502 | 1/1980 | Anderson, Jr. | 135/114 |
| 4,459,787 | 7/1984 | Wilcox | 135/15.1 |
| 5,006,025 | 4/1991 | Duran | 411/177 |
| 5,163,710 | 11/1992 | Chirtel et al. | 403/299 |

FOREIGN PATENT DOCUMENTS

| | | | |
|---|---|---|---|
| 480080 | 8/1974 | Australia | 411/177 |
| 1435952 | 3/1966 | France | 248/159 |
| 1042526 | 9/1966 | United Kingdom | 411/177 |
| 2058987 | 4/1981 | United Kingdom | 403/299 |

Primary Examiner—Carl D. Friedman
Assistant Examiner—Wynn E. Wood
Attorney, Agent, or Firm—Philip Young

[57] ABSTRACT

A pole extension system for rigidly and tightly connecting an extension pole to a main pole. The main pole has a cylindrical end portion into which a T-nut is securely mounted coaxial with the pole axis. The extension pole has a cylindrical end portion forming an alignment shaft having a diameter that is smaller than the diameter of the main portion of the extension pole, such that an abutment shoulder is formed where the pole end portion meets with the extension pole. A bolt is mounted at the end of the alignment shaft and adapted for being screwed into the T-nut as the main pole and the extension pole are rotated relative to each other. A stabilizer means is mounted at the end portion of the main pole and includes a long tubular alignment sleeve having a length which extends past the end portion of the main pole and receives therein the alignment shaft in a close fitting relationship. In the connection step, the main pole is tightly and firmly attached to the extension pole by turning the poles relative to each other, thereby tightening the bolt and nut, with the poles further securely maintained by the alignment sleeve fitting around the alignment shaft and butted against the abutment shoulder on the extension pole.

10 Claims, 1 Drawing Sheet

EXTENSION POLE HAVING STABILIZER MEANS FOR SECURELY ATTACHING THE EXTENSION POLE TO THE MAIN POLE

BACKGROUND OF THE INVENTION

1. Field of The Invention

The present invention relates to pole extension systems and, more particularly, to systems for connecting an extension pole to a main pole used, for example, in the large size pole of a "garden umbrella".

2. Background Art

In many applications where long poles are employed, such as in the garden umbrella, a two piece pole is attached together to provide the full pole length required. Use of the two piece pole facilitates the shipping, use and storage of the umbrella and the pole since the pole length is reduced to 50% of the fur pole length. Where, for example, an 8 foot long pole is required the umbrella, use of two 4 foot sections of pole connected together greatly reduces the length of the overall umbrella size at those times other than when the umbrella is open. One problem found in the conventional umbrella poles is that there is a significant amount of play or relative movement between the main pole and its extension pole. This play is due to the loose connection means used between the main pole and its extension In the commonly known extension poles, a main pole has a thredded screw or nut attached at its end, while the extension pole has a mating nut or screw at its end for attachment to the mating screw or nut, respectively, at the end of the main pole. One problem with this connection is that the the screw and nut joint becomes a pressure point for the pole, resulting in a loosening of the screw and nut from their pole connections, as well as unscrewing and loosening of the connection after a certain amount of use. Another type of pole connection, often used with aluminum garden umbrella poles, consists of hollow aluminum poles sized to fit, one within the other at their ends with a pop-up locking button that extends from the inner pole through a hole in the outer pole to thereby lock the poles against relative movement. The problem with this pop-up button type of connection is that the button becomes the pressure joint for the connection and cannot provide a tight, rigid connection so as to prevent the poles from twisting and relative movement. Another problem with the pop-up locking button is that the it may become a tedious task to set the button from one pole to fit into the hole in the other pole. The problems with the above-described known extension pole connections is the looseness and play between the poles may limit the stability and durability of the pole and extension, and in some cases such as that of an umbrella pole, may result in damage to the umbrella. Other known pole extension devices are complex and relatively expensive.

SUMMARY OF THE INVENTION

In view of the above, it is an object of the present invention to provide a connection means for a pole and an extension pole which rigidly connects the poles together with no movement or twisting permitted between the poles.

It is another object of the invention to provide a connection means for a pole and an extension pole which rigidly connects the poles together with substantially no play between the poles. It is another object of the invention to provide a connection means for a pole and an extension pole which is simple and requires no complex coupling and attachment means.

These and other objects are achieved by the present invention which provides a pole extension system for tightly connecting an extension pole to a main pole. The main pole has a cylindrical end portion into which a T-nut is securely mounted coaxial with the pole axis. The extension pole has a cylindrical end portion forming an alignment shaft having a diameter that is smaller than the diameter of the main portion of the extension pole, such that an abutment shoulder is formed where the pole portion meets with the larger main portion of the extension pole. A hanger bolt is mounted at the end of the alignment shaft on the extension pole with the bolt end protruding outward and adapted for being screwed into the T-nut as the main pole and the extension pole are rotated relative to each other and thereby attached together. A stabilizer means for rigidly and tightly connecting the poles together includes a long cylindrical alignment sleeve which is attached to the end portion of the main pole and is sized such that its length extends substantially past the end portion of the main pole and receives the alignment shaft at the end portion of the extension pole in such sleeve. The end of the alignment sleeve is adapted to be closely fitted around the alignment shaft and butted up against the abutment shoulder at the point during connection where the bolt is screwed into the T-nut.

Thus, the main pole is tightly and firmly attached to the extension pole by tightening the bolt and nut, with the poles further securely maintained by the alignment sleeve tightly fitting around the alignment shaft of the end portion of the extension pole and butted against the abutment shoulder. The combination of the alignment sleeve and nut on the main pole, with the alignment shaft, the abutment shoulder and the bolt on the extension pole, provides a very rigid extension

DESCRIPTION OF THE PREFERRED EMBODIMENTS

Figure 1:
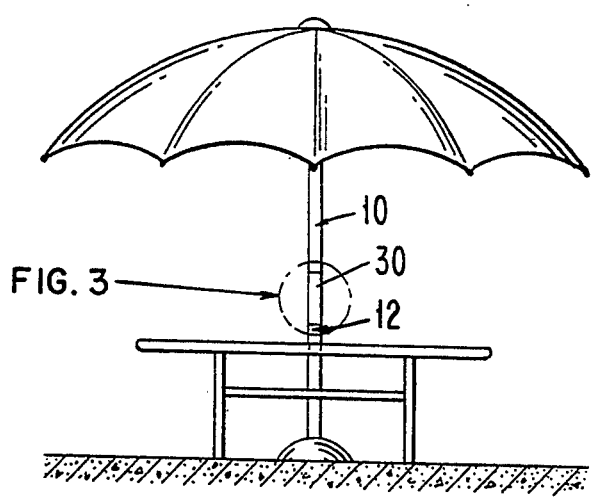
FIG. 1 is a side view of the pole extension system employed in a garden umbrella, illustrative of the present invention.

Referring to FIG. 1, the pole extension system has application in the garden umbrella, such as is shown where a main pole 10 is required to be tightly connecting to an extension pole 12. Poles 10 and 12 are made of a hardwood material, such as oak or dash. As shown in the unassembled view of FIG. 2 and the assembled view of FIG. 3, the main pole 10 has a cylindrical end portion 14 with a flat end surface 16 into which a hanger bolt 18 is securely mounted by screwing the screw end part 18B of bolt 18 into the flat end surface 16 and the end portion 14 with the threaded bolt end 18A of the bolt 18 extending out from the end surface 16 in coaxial relationship between the bolt 18 and the longitudinal axis of the cylindrical main pole 10.

The extension pole 12, also made of a hardwood material, has a cylindrical end portion 20 having a diameter d2 that is smaller than the diameter of the middle portion of the extension pole 12, such that an abutment shoulder 22 is formed where the pole end portion 20 meets with the middle portion of extension pole 12. The pole end portion 20 has a metal outer wall made of a metal cylinder tube or sleeve 24 which extends from the abutment shoulder 22 to the flat end surface 26 of the end portion 20. Metal sleeve 24 is made, for example, of a 0.0625 inch thick cylindrical tube of aluminum or steel. The sleeve 24 secured to the hardwood end portion 20 of extension pole 12 by locking detents 40 and 40', or other locking means, such as screws, not shown. The pole end portion 20 and cylindrical sleeve 24 constitute an "alignment shaft" of the extension pole 12, having a length L2, and may be referred to herein as such alignment shaft. The external diameter of the alignment sleeve 24 is indicated by the diameter d2 and represents the diameter of the alignment shaft, the end of which terminates at the abutment shoulder 22 extending in a ring around the alignment sleeve 24.

A T-nut 28 is mounted through the flat end surface 26 of the end portion 20 of the extension pole 12. The T-nut 28 has a flat top surface 28A encircling an interiorly threadded core 28B having threads that matingly engage with the exterior threads on the bolt portion 18A of the hangar bolt 18. The T-nut 28 has a plurality of prongs 28C extending out from its top surface 28A for securing the T-nut 28 onto the end portion 20 of pole 12. The T-nut 28 is mounted with its threaded core 28B tightly fitted in a hole bored in the end portion 20 such that the top surface 28A of the T-nut 28 is almost flush with the end surface 26 of the pole, as shown, and the prongs 28C are embedded into the end portion of the pole 12. The T-nut 28 is mounted coaxially on the central longitudinal axis of the pole 12 and adapted for receiving the bolt 18 which is screwed therein as poles 10 and 12 are attached to each other.

A stabilizer means for rigidly and tightly connecting the poles together includes a cylindrical alignment sleeve 30 made, for example, of a 0.0625 inch thick aluminum or steel tube, which is attached to the hardwood end portion 14 of the main pole 10 by locking detents 38 and 38'. Alternately, other locking means, such as locking pins or screws, not shown, may be employed in lieu of the detents 38 and 38' shown. The locking detents 38 and 38 ' are located, respectfully, on opposite sides of the alignment sleeve 30, 180 degrees apart. While two detents 38 and 38' are shown, more can be employed. The detents 38 and 38' comprise metal portions of the sleeve 30 that extend into the wood part of the main pole 10 to thereby secure the sleeve 30 against movement relative to the main pole 10. The alignment sleeve 30 is sized such that its end 32 extends past the end surface 16 of the main pole 10 by a length L1 which equals the length L2 of the alignment shaft provided at the pole extension 20. The alignment sleeve 30 has an interior diameter d1 which is slightly greater than the exterior diameter d2 of the sleeve 24 of the alignment shaft by an amount which provides a sliding fit between the shaft and sleeve 30, but with essentially little or no play between the parts, for reasons which will become apparent below.

In this manner, the alignment sleeve 30 is adapted to receive the alignment shaft, comprising the end portion 20 of the extension pole, therein until the point during connection where the bolt 18 is screwed into the T-nut 28 by turning the pole 10 relative to the extension pole 12. The turning motion stops when the end surface of the main pole 10 contacts the top flat surface 28A of the T-nut 28A and the bolt end 18A is screwed into the T-nut 28, as shown by the position of the poles in FIG. 3. At this point, end 32 of the alignment sleeve 30 is butted against the shoulder 22 of the extension pole 12. Thus, the main pole 10 is tightly and firmly attached to the extension pole 12 by tightening the bolt 18 and nut 28, with the poles further securely maintained by the alignment sleeve 30 tightly fitting around the sleeve 24 of the extension pole 12 and butted against the shoulder 22 on the extension pole. The poles 10 and 12 can be separated by turning them in the reverse direction, counterclockwise until the bolt 18 unscrews from the T-nut 28. The alignment shaft of the extension pole 12 then is pulled out of the alignment sleeve 30 of the main pole 10.

Figure 2:
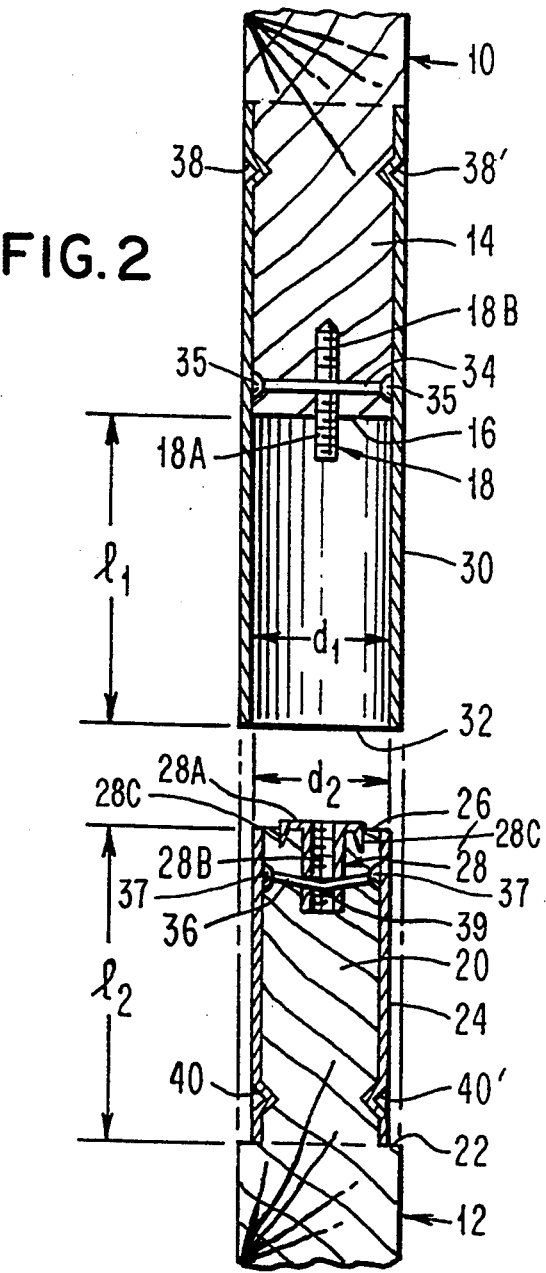
FIG. 2 is a longitudinal cross-sectional view of the pole extension system, taken through the longitudinal axis of the cylindrical poles, prior to connecting the main pole to the extension pole.
Figure 3:
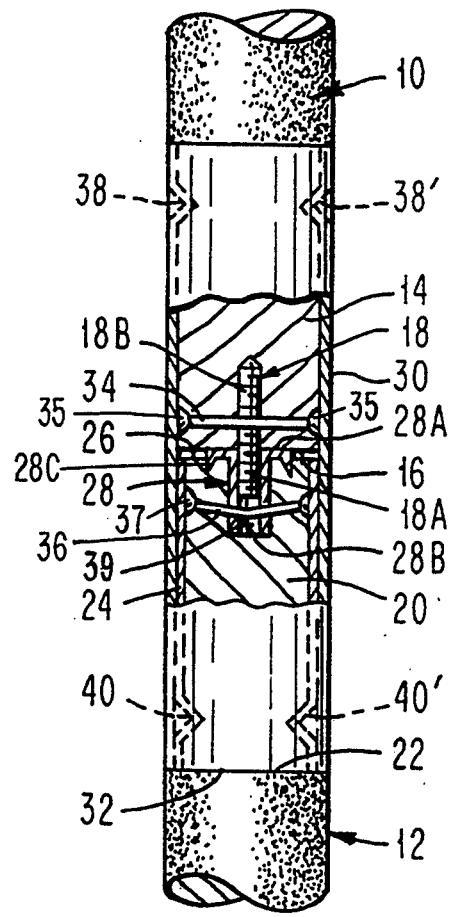
FIG. 3 is a longitudinal view, in partial cross-section, of the pole extension system, with the pole extension pole connected together by the bolt and nut and further rigidly held together by the alignment sleeve and alignment shaft arrangement.

Since the hanger bolt 18 may loosen itself from the main pole 10 after several attachment operations, a locking pin 34, made of a steel pin, is hammered through the end portion 14 of pole 10 and a hole drilled through the portion 18B of bolt 18 such that the locking pin 34 extends across the pole, as shown. Each end of the locking pin 34 is hammered to form a head 35 to further maintain in position the bolt 18 and locking pin 34 and prevent them from twisting or rotating in the wood pole during the assembly and dis-assembly operations. It is noted that the bolt 18 has a hole drilled through it, prior to assembly of the bolt on the pole, which hole is adapted to receive the locking pin 34. Similarly, the T-nut 28 is provided with a locking pin extending, as shown in FIGS. 2 and 3, through a hole drilled transversely through the lower part of threadded core 28B of the T-nut 28. The locking pin 36, as shown in FIG. 3, is mounted at the lower part of the core 28B so that it does not interfere with the bolt 18 received in the core 28B. Each end of the locking pin 36 is hammered to form heads 37 to further maintain in position the T-nut 28 and locking pin 36 and prevent them from twisting or rotating in the wood pole during the assembly and dis-assembly operations. During manufacture, the locking pin 36 is bent into a slight V-shape by inserting a long metal bar, not shown, into the central opening of the T-nut 28 so as to tap down on the pin 36 to bend it into the v-form with a bend 39 shown. This bend in the locking pin 36 further secures the T-nut 28 tightly to the wood pole 12 such that the T-nut 28 will not twist or pull out of the pole 12.

While the invention has been described above with respect to its preferred embodiments, it should be understood that other forms and embodiments may be made without departing from the spirit and scope of the present invention.

What is claimed is:

1. A pole extension system for tightly connecting a main pole to an extension pole, comprising:
   a main pole having a cylindrically shaped connecting end portion having a longitudinal axis, including a first screw means securely mounted at said connecting end portion in axial alignment with the longitudinal axis thereof;
   an alignment sleeve made of a hollow rigid tube which covers said connecting end portion of said main pole and is attached thereto, said alignment sleeve having a length which extends axially out from said connecting end portion of said main pole and said first screw means by a length L1;

an extension pole having at one end an alignment shaft comprising a cylindrically shaped connecting end portion having a longitudinal axis, said alignment shaft having a diameter that is slightly smaller than the interior diameter of said alignment sleeve to provide said alignment shaft to be received in said alignment sleeve in a close fitting relationship, including a second screw means securely mounted at said connecting end portion of said extension pole in axial alignment with said longitudinal axis of said extension pole, said second screw means adapted to screw onto and lockingly engage with said first screw means as said alignment shaft is received in said alignment sleeve and said extension pole is rotated relative to said main pole, said alignment shaft having a length L2 equal to said alignment sleeve length L1, and shoulder abutment means at the end of said alignment shaft located said length L2 from said second screw means and adapted to abut with said alignment sleeve at the point where said first screw means is screwed onto said second screw means;

whereby the combination of said first and second screw means, said tight fit of said alignment shaft in said alignment sleeve, and said shoulder abutment means for engaging with said alignment shaft, provides a rigid and stable connection between said main pole and pole extension.

2. A pole extension system as recited in claim 1, wherein said first screw means comprises a hanger bolt having one end screwed into said connecting end portion of said main pole for mounting said hanger bolt to said main pole, said hanger bolt having its other end extending out from said connecting end portion along its longitudinal axis.

3. A pole extension system as recited in claim 2, further comprising a locking pin extending through said connecting end portion of said main pole and through said hanger bolt for further securing said hanger bolt to said connecting portion of said main pole and preventing said hanger bolt from twisting relative to said main pole as said hanger bolt is screwed onto said second screw means.

4. A pole extension system as recited in claim 3, wherein said locking pin further comprises a head portion at each end of said locking pin for securely maintaining said locking pin in a fixed position through said connecting end portion of said main pole.

5. A pole extension system as recited in claim 1, wherein said second screw means comprises a T-nut embedded into said connecting end portion of said extension pole, said T-nut having a flat top surface encircling an interiorly threaded core having threads which matingly engage with the exterior threads on said first screw means as said main pole and extension pole are rotated relative to one another.

6. A pole extension system as recited in claim 5, wherein said flat top surface of said T-nut further comprises a plurality of prongs which are imbedded into a flat end portion of said connecting end portion of said extension pole.

7. A pole extension system as recited in claim 5, further comprising a locking pin extending through said connecting end portion of said extension pole and through said T-nut for further securing said T-nut to said connecting end portion of said extension pole and preventing said T-nut from twisting relative to said extension pole as said T-nut is screwed onto said first screw means.

8. A pole extension system as recited in claim 7, wherein said locking pin further comprises a head portion at each end of said locking pin for securely maintaining said locking pin in a fixed position through said connecting end portion of said extension pole.

9. A pole extension system as recited in claim 1, wherein said alignment sleeve comprises a cylindrical metal tube which is attached to said connecting end portion of said main pole by locking detents extending from said tube into said main pole.

10. A pole extension system as recited in claim 1, wherein said alignment shaft of said extension pole includes a cylindrical metal sleeve secured to said connecting end portion said extension pole, the outside diameter of said alignment shaft and its metal sleeve being adapted to provide a close fitting relationship with the interior diameter of said alignment sleeve of the main pole.

* * * * *